United States Patent [19]
Trenner

[11] Patent Number: 5,123,770
[45] Date of Patent: Jun. 23, 1992

[54] DEVICE FOR THE RELEASABLE CONNECTION OF TWO SECTIONS

[75] Inventor: Albrecht Trenner, Langendorf, Switzerland

[73] Assignee: Montech AG, Derendingen, Switzerland

[21] Appl. No.: 747,188

[22] Filed: Aug. 19, 1991

[30] Foreign Application Priority Data

Aug. 24, 1990 [DE] Fed. Rep. of Germany ....... 4026737

[51] Int. Cl.⁵ ............................................. B25G 3/36
[52] U.S. Cl. .................... 403/338; 403/312; 403/310
[58] Field of Search ............... 403/314, 337, 338, 310, 403/312

[56] References Cited

U.S. PATENT DOCUMENTS

| 2,614,796 | 10/1952 | Miller | 403/338 |
| 2,772,853 | 12/1956 | Woodworth | 403/314 X |
| 4,082,324 | 4/1978 | Obrecht | 403/338 X |

FOREIGN PATENT DOCUMENTS

| A21040 | 9/1956 | Fed. Rep. of Germany | 403/337 |
| 148370 | 5/1981 | Fed. Rep. of Germany | 403/312 |

Primary Examiner—Andrew V. Kundrat
Attorney, Agent, or Firm—Bachman & LaPointe

[57] ABSTRACT

Device for the releasable connection of two sections including an upper and lower profile strip, with corresponding grooves, which are connected to one another by use of screw bolts or the like.

8 Claims, 2 Drawing Sheets 5,123,770

DEVICE FOR THE RELEASABLE CONNECTION OF TWO SECTIONS

BACKGROUND OF THE INVENTION

The invention relates to a device for the releasable connection of two sections, rail elements or the like which have at least one insert wedge engaging into at least one groove of a profile strip When two sections, for example extruded sections, rail elements or the like, are to be connected releasably to one another, as a rule a plate is used as a coupling for this. Such a plate is first fastened to one section, tabs, for example formed on laterally, engaging over this section. The tabs have bores for screw connections with the other section Such coupling plates therefore possess exactly standardized bores at prescribed spacings If these spacings are not adhered to, problems arise during assembly.

However, it is often undesirable, obstructive or unacceptable for technical reasons if tabs project laterally beyond a section. Frequently, therefore, edge chamfers are made on the section itself, so that any fastening means can be inserted at least partially behind the chamfer. Again, the screwing tool can reach this region only with great difficulty and inadequately.

A connection by means of a kind of fastening claw according to German utility model G 87 03 105.1 has proved a better solution for the releasable connection of two sections, especially also of the connection of extruded sections. Such fastening claws preferably . consist of profile strips which are arranged between the sections to be connected and which are coupled to one another by means of threaded bolts, screw bolts or the like.

Formed in the profile strip itself are longitudinal grooves, indentations or the like which, in the position of use, engage into a corresponding groove in the sections.

The screw bolts pass through the profile strips between the two sections and are therefore easily accessible from the side. The disadvantage of such connecting elements is, however, that the longitudinal grooves, indentations or the like are always made plane-faced and the insert wedges of the sections consequently bear against these groove walls over their entire surface.

However, since dimensional differences occur especially in extruded sections to be connected, it is possible that the fastening claws will tilt in the region of such dimensional differences during the wedging of the sections to be connected and thus prevent the secure fixing desired. A subsequent mutual displacement of the two connected sections in the region of use is not impossible, although this can entail serious consequences especially when, for example, a carrier unit is connected to a working tool.

SUMMARY OF THE INVENTION

The inventor's set object was to devise a device of the abovementioned type which has the handling . advantages of the fastening claws described and which allows a secure fixing of sections even when there are dimensional differences.

To achieve this object, the groove has an outer groove wall of convex curvature and an inner groove wall, the latter extending at an angle and inclined relative to a mid-axis of the profile strip. The arrangement of only one profile strip with only one groove according to the invention is conceivable. Furthermore, a groove according to the invention can be provided on one side or on both sides of a mid-axis.

BRIEF DESCRIPTION OF THE DRAWINGS

Further advantages, features and details of the invention emerge from the following description of preferred exemplary embodiments and from reference to the drawings, in which.

DETAILED DESCRIPTION

Figure 1:
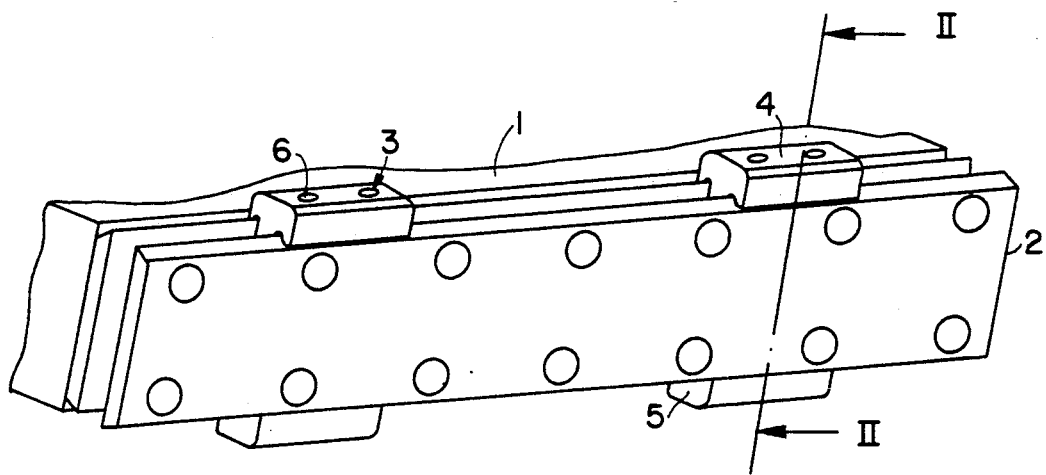
FIG. 1 shows a perspective view of a partly broken section and of a rail element which are connected to one another by means of a device according to the invention.

In a preferred exemplary embodiment, the device according to the invention for the releasable connection of two sections consists of two profile strips, an upper one and a lower one, with corresponding grooves, which are connected to one another in the position of use by means of screw bolts or the like. The two profile strips have approximately the same rectangular shape in cross-section.

To the outside, the profile strips form an approximately plane back which flanks adjoin laterally. Sharp edges, chamfers or roundings can be provided between the flanks and back. The underside of the profile strip is equipped with two grooves which extend approximately parallel to a mid-axis and which have an outer and an inner groove wall. The groove bottom formed by the outer and inner groove walls is rounded and approximately constitutes a valley.

A principal idea of the invention is that the outer groove wall is not plane-faced, but convexly curved. The inner groove wall, although plane-faced, nevertheless has a slight inclination relative to the middle of the underside of the profile strip. The outer groove wall forms together with the flank of the profile strip a wedge-shaped insert. Likewise, an approximately wedge-shaped insert is formed as a result of the abovementioned slight inclination of the inner groove wall relative to the middle of the underside of the profile strip. The tip of the wedge-shaped insert formed by the outer groove wall and the flank is rounded.

A groove shaped in this way is assigned, in the position of use, a sectional part, a rail element or the like, the sectional part, rail element or the like being approximately dovetail-shaped or trapezoidal and having a sloping face on at least one side. To connect two sectional parts, rail elements or the like so formed, the wedge-shaped inserts of both the upper profile strip and the lower profile strip engage behind the abovementioned sloping faces of the sectional parts, rail elements or the like, so that insert wedges, which are formed by the sloping faces and the respective end faces of the sectional parts, rail elements or the like to be connected, engage into the grooves of the profile strips.

For fixing, a fastening element, for example, a threaded bolt or the like, passes through the upper and lower profile strips, passing through an interspace between the end faces of the sectional parts, rail elements or the like to be connected. The interspace is formed by the two wedges between the grooves of the upper and lower profile strips.

While the upper profile strip preferably has a stepped bore for receiving a threaded bolt with a threaded head, a threaded bore for receiving the threaded part of the corresponding threaded bolt, screw bolt or suchlike fastening element connecting the two profile strips is made in the lower profile strip. For better guidance, the threaded bore of the lower profile strip for receiving the threaded part of the threaded bolt, screw bolt or the like is assigned an opening guide channel.

However, it is also perfectly conceivable to use only profile strips with the corresponding stepped bores for connecting sectional parts, rail elements or the like to one another or relative to one another. Instead of the threaded bore, a threaded nut can then be inserted into the profile strip.

Such an arrangement represents, above all, a considerable cost saving in terms of production.

For the final fixing of the profile strips, rail elements or the like, the upper and lower profile strips are pulled towards one another by an appropriate rotation of the threaded bolts, threaded screws or suchlike fastening elements, with the result that the insert wedges formed by the sloping faces and end faces are wedged in the grooves of the profile strips. This produces small-surface contacts between the sloping faces and the outer convexly curved grooved wall on the one hand and the end faces and the inner inclined grooved wall on the other hand. This type of contact surface in conjunction with the groove bottom designed as a valley and the rounded tips of the wedge-shaped inserts prevents the possibility of tilting during the fixing operation. The faces resting on one another slide over one another easily until the final fixing has taken place. There is no possibility of a subsequent mutual slipping or shifting without a previous slackening of the threaded bolts, screw bolts or suchlike fastening elements. On the other hand, however, by a slight slackening of the threaded bolts, screw bolts or the like, the connecting elements can be displaced substantially more easily along sections or rail elements or the like, as can the connected profile strips, rail elements or the like relative to one another.

The above-described shaping of the grooves in the profile strips compensates any dimensional differences in the sections to be connected, thereby ensuring the final secure fixing desired. Because the fastening elements, for example, threaded bolts, screw bolts or the like, extend between the profile strips, rail elements or the like to be fastened, they can always easily be reached on all sides with an appropriate screwing tool.

It is also conceivable, of course, for profile strips to be shaped with grooves of the above-described type not only linearly, but also, for example, in the manner of a gateway arch, for example for fixing two disks, live rings, rotary units or the like, these disks, live rings or the like being shaped accordingly at the edge.

It is likewise conceivable for the profile strips to be shaped, for example, linearly on one side and in the manner of a gateway arch on the other side, in each case with grooves of the type described above. By means of profile strips of this type, for example disks, live rings, rotary units or the like can be fixed to linear sections, rail elements or the like.

Such fastening elements can also serve, for example, for connecting sections with roof-shaped grooves or rectangular grooves to one another.

There are countless examples of the use of such connecting elements according to the invention, and therefore no restrictions will be made here.

FIG. 1 shows as examples of two elements to be connected a section 1 and a rail element 2 which are connected to one another via two connecting elements 3 according to the invention.

Figure 2:
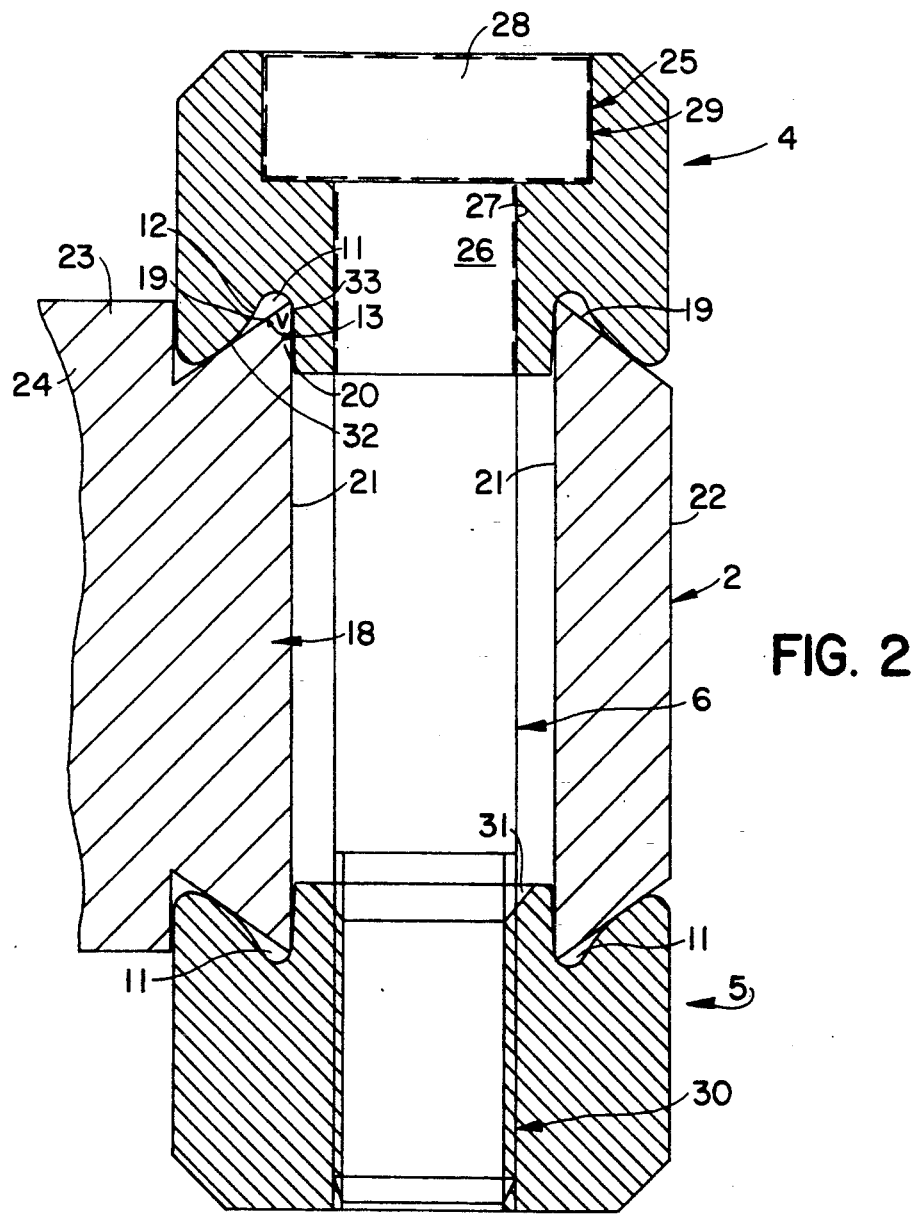
FIG. 2 shows a cross-section through the device in the position of use along the line II—II of FIG. 1.

Thus, as can be seen especially in FIG. 2, a connecting element 3 consists of an upper profile strip 4 and of a lower profile strip 5. For the mutual fixing of the section 1 and rail element 2, the two profile strips 4 and 5 are connected to one another by means of a threaded bolt 6, screw bolts or the like.

Figure 3:
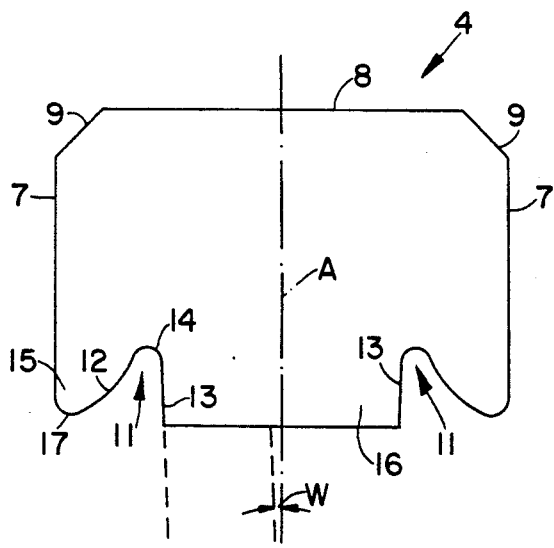
FIG. 3 shows a top view of a profile strip of the connecting element according to FIG. 1.

In cross-section, the two profile strips 4 and 5 each have the same shape. As also shown in FIG. 3, such a shape is approximately rectangular.

To the outside, the profile strip 4 forms an approximately plane back 8 which flanks 7 adjoin laterally via chamfers 9. These flanks 7 extend approximately parallel to one another. The underside of the profile strip 4 is equipped with two grooves 11 which extend approximately parallel to a mid-axis A and which have an outer groove wall 12 and an inner groove wall 13. The groove bottom 14 connecting the outer groove wall 12 and the inner groove wall 13 is made rounded.

According to the invention, the outer groove wall 12 is convexly curved, while the inner groove wall 13 is straight, but has an inclination of an angle w relative to the mid-axis A of the profile strip 4. The outer groove wall 12 forms with the flank 7 a wedge-shaped insert 15. Likewise, a wedge-shaped insert 16 can be seen between two inner groove walls 13 located opposite one another. A tip 17 of the wedge-shaped insert 15 is also rounded.

In the position of use, this groove 11 so formed is assigned a sectional part 18 or the rail element 2. As seen in cross-section, both the sectional part 18 and the rail element 2 are made dovetail-shaped or trapezoidal, a sloping face 19 being provided on at least one side. An end face 21 of the sectional part 18 or rail element 2 extends at an acute angle v relative to this sloping face 19, the sloping face 19 and part of the end face 21 together forming an insert wedge 20. Whereas, on the rail element 2, an outer face 22 adjoins the sloping face 19 relative to the end face 21, the sectional part 18 is part of a general section 1, in the present exemplary embodiment a further sectional part 23 forming with the sloping face 19 a V-shaped groove 24.

Figure 4:
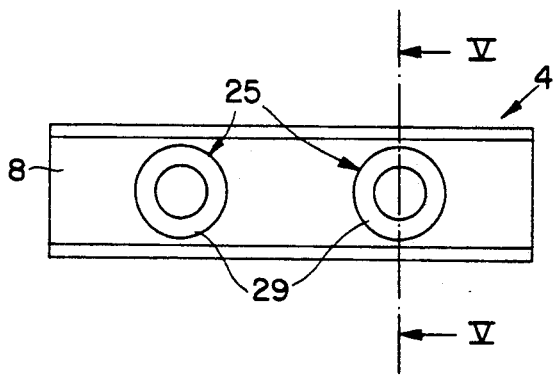
FIG. 4 shows a top view of an upper profile strip.
Figure 5:
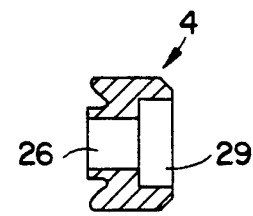
FIG. 5 shows a cross-section through the profile strip along the line V—V in FIG. 4.
Figure 6:
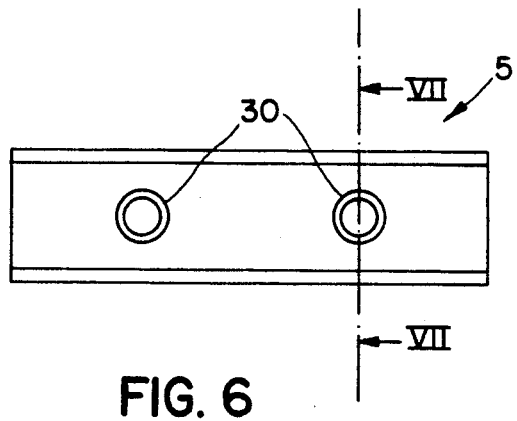
FIG. 6 shows a top view of a lower profile strip.
Figure 7:
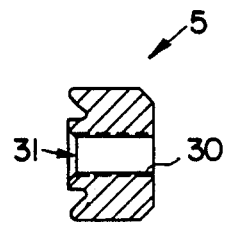
FIG. 7 shows a cross-section through the lower profile strip along the line VII—VII in FIG. 6.

According to FIG. 2 or FIGS. 4 and 5, the upper profile strip 4 possesses a stepped bore 25 for receiving the threaded bolt 6. Thus, the threaded bolt 6 passes with its shank 26 through a bore part 27 of smaller diameter, while a bolt head 28 is received by a countersunk hole 29 of the stepped bore 25.

The lower profile strip 5 is of the same cross-sectional design as the upper profile strip 4, with the exception of a threaded bore (30). Here too, corresponding grooves 11 are formed in one face. However, the threaded bore 30 passes cylindrically through the profile strip 5, and it opens conically towards the upper profile strip 4 via a guide channel 31 for the threaded bolt 6.

In the position of use, the insert wedges 20 of the sectional part 18 and of the rail element 2 engage into the corresponding grooves 11 of the upper and lower profile strips 4 and 5. As a result of a rotation of the screw bolt 6, the two profile strips 4 and 5 are pulled towards one another, with the result that the insert wedges 20 are wedged in the grooves 11. Contact surfaces 32 between the sloping face 19 and outer groove wall 12 and contact surfaces 33 between the end faces 21 and inner groove wall 13 are obtained thereby. As a result of the convex curvature of the outer groove wall 12 and the slight inclination of the inner groove wall 13 at the angle w, any differences of the mean length 1 of the sectional part 18 and rail element 2 are compensated. These differences in the length 1 must always be allowed for even when the sections 1 or rail elements 2 are extruded.

There is no possibility that the insert wedges 20 will tilt in the grooves 11, since the outer and inner groove walls 12 and 13 and the sloping face 19 and end face 21 do not bear against one another over their entire surface, but have only contact surfaces 32 and 33. The connecting elements 3 can also thereby be displaced substantially more easily and more effectively along sections 1 or rail elements 2, the threaded bolt 6 only having to be slackened slightly. If insert wedges 20 bear over their entire surface in the groove 11, it is also possible that the tip 17 of the wedge-shaped insert 15 or the tip of the insert wedge 20 will be indented. This is likewise prevented by the shaping according to the invention of the groove 11.

I claim:

1. A device for the releasable connection of two sections, rail elements or the like, which comprises: two sections each of which having at least one insert wedge; a profile strip having a mid-axis and spaced grooves, wherein the wedges of each section engage into a corresponding groove; wherein each groove has an outer groove wall of convex curvature and an inner groove wall extending at an angle and inclined relative to said mid-axis.

2. Device according to claim 1, wherein the outer and inner groove walls are connected to one another via a rounded groove bottom.

3. Device according to claim 1, wherein the profile strip includes two flank portions and wherein each outer groove wall and the corresponding flank portion forms a wedge-shaped inset with a rounded tip.

4. Device according to claim 1 including connecting means passing through the profile strip and between the sections.

5. Device according to claim 4 including two of said profile strips, the grooves of which are located opposite each other, said two profile strips being connected to one another by a connecting means.

6. Device according to claim 5, wherein said connecting means is a threaded bolt.

7. Device according to claim 6, wherein one of said profile strips has a stepped bore through which passes the threaded bolt, and wherein the other of said profile strips has a threaded bore which engages the threaded bolt.

8. Device according to claim 7, wherein the profile strip having a threaded bore also has an opening guide channel for guiding the threaded bolt.

* * * * *